United States Patent

[11] 3,619,317

| [72] | Inventors | William Shulver<br>Saylesville, R.I.;<br>Donald L. Blake, Seekenk, Mass. |
|---|---|---|
| [21] | Appl. No. | 627,405 |
| [22] | Filed | Mar. 31, 1967 |
| [45] | Patented | Nov. 9, 1971 |
| [73] | Assignee | Owens-Corning Fiberglass Corporation |

[54] TENSILE MEMBERS, APPARATUS AND PROCESS
11 Claims, 14 Drawing Figs.

[52] U.S. Cl. .................................................. 156/180,
156/196, 156/296, 156/441, 117/115
[51] Int. Cl. ........................................................ D04h 3/08,
B29c 6/02
[50] Field of Search............................................ 156/166,
180, 29 C, 433, 441, 494, 311, 322, 199, 499, 161,
167; 117/115; 165/120

[56] References Cited
UNITED STATES PATENTS

| 3,042,569 | 7/1962 | Paul ............................... | 156/180 X |
| 3,042,570 | 7/1962 | Bradt.............................. | 117/115 X |
| 3,227,577 | 1/1966 | Baessler et al. ............... | 117/115 X |
| 3,287,158 | 11/1966 | Whitfield........................ | 117/115 X |
| 3,346,413 | 10/1967 | Lindemann .................... | 117/115 X |
| 3,432,332 | 3/1969 | Marzocchi et al. ............ | 117/115 X |
| 3,470,051 | 9/1969 | Meyer............................. | 156/180 X |
| 3,471,322 | 10/1969 | Medney.......................... | 117/115 |
| 3,498,038 | 3/1970 | Shulver .......................... | 156/172 |
| 3,508,990 | 4/1970 | Marzocchi...................... | 156/180 X |

Primary Examiner—Carl D. Quarforth
Assistant Examiner—Roger S. Gaither
Attorneys—Staelin and Overman and Leslie H. Blair ABSTRACT: Composite tensile members made up of a plurality of line-type tensile elements, such as continuous glass fibers, embedded in an encapsulating matrix of hardenable material, such as thermosetting resin, hardenable metal, etc. The glass fibers (line-type tensile elements) are carefully oriented in side-by-side relationship so that they are all substantially equally load bearing, so as to support a designed load without incurring individual fiber breakage. The matrix helps distribute the interfiber loading. Thus, all fibers are utilized. Though specifically applicable to nonyielding line-type tensile elements, fibers of metals and resins might also be used in the product and process. On a strength to weight ratio, strengths 5x the best steel wires in conventional cables, are provided in the unique composite members of the invention, using continuous glass fibers.

Apparatus and process for producing the composite tensile members wherein a molten bath is used as the direct heat-transfer and pressurizing medium.

THE PROBLEM

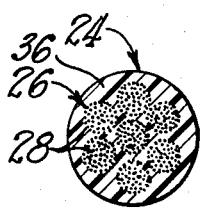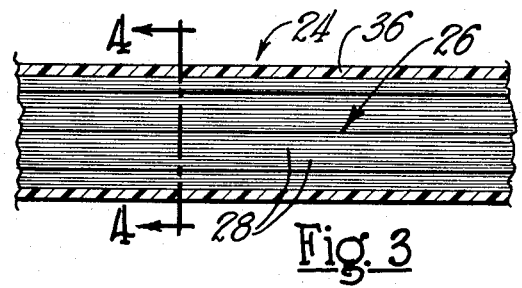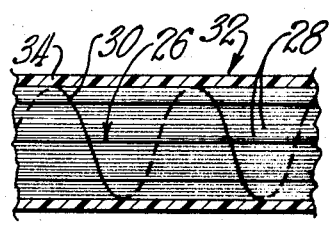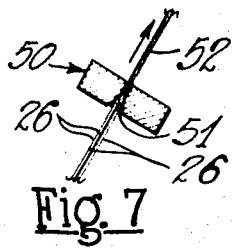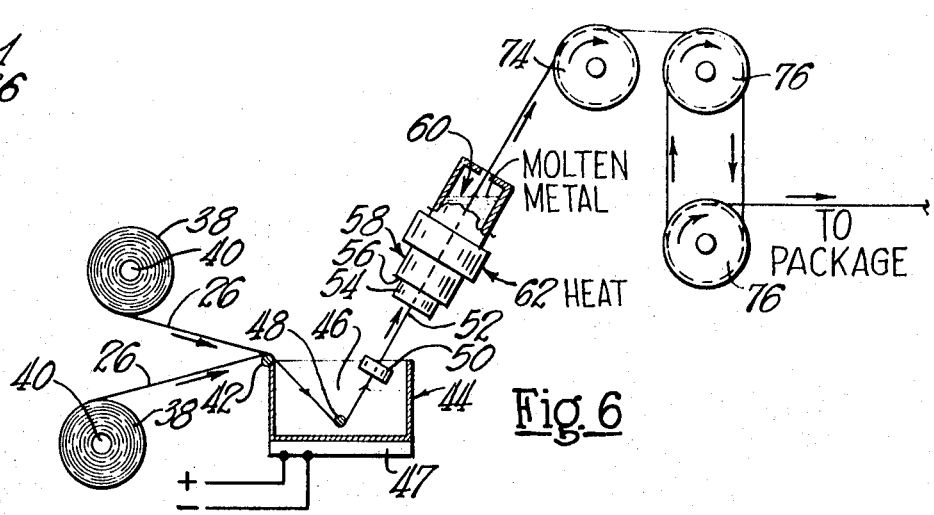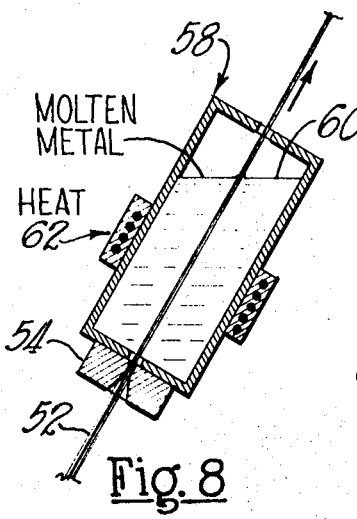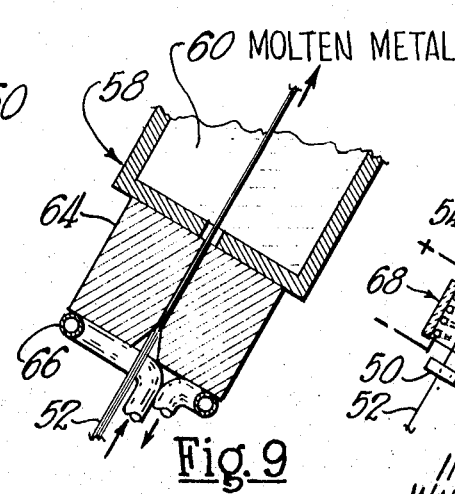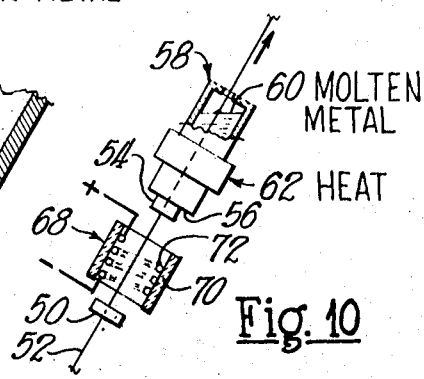

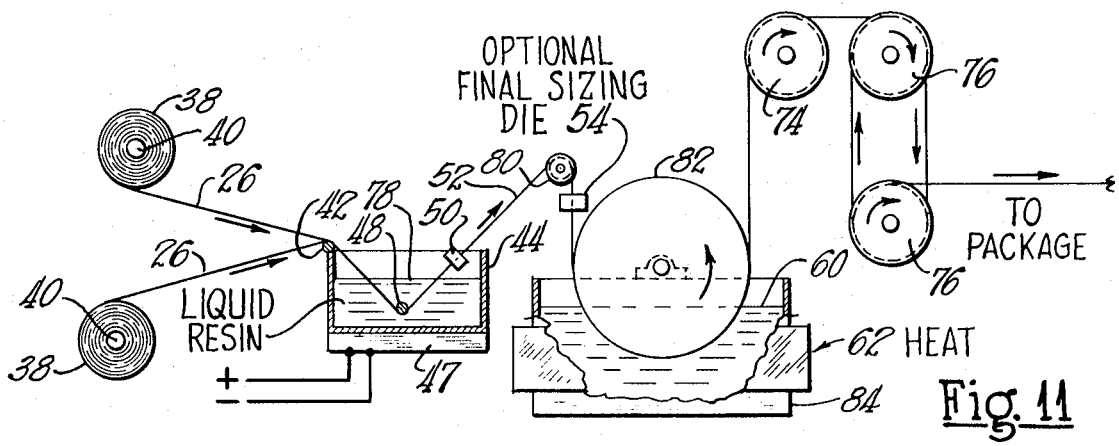
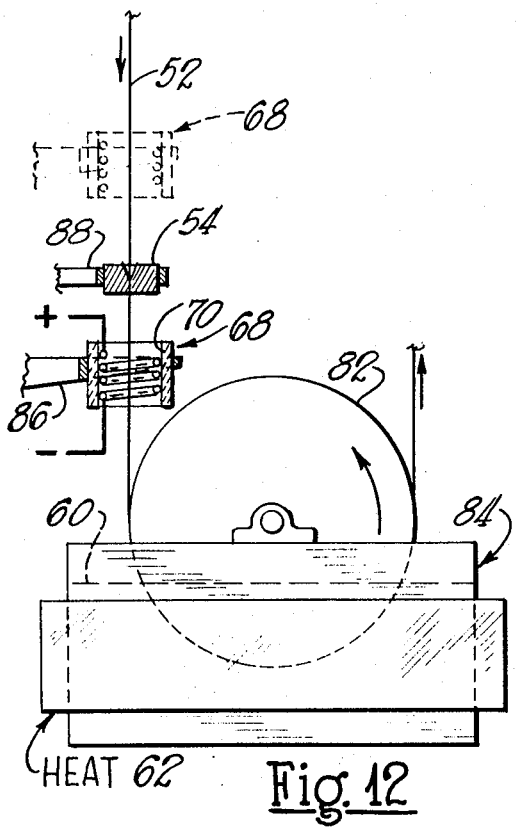
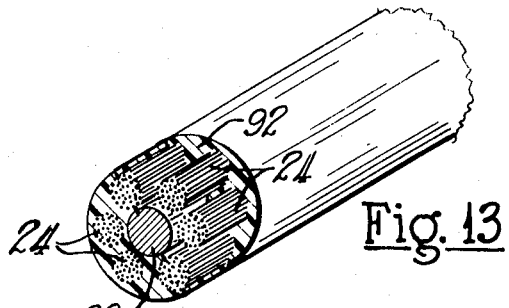
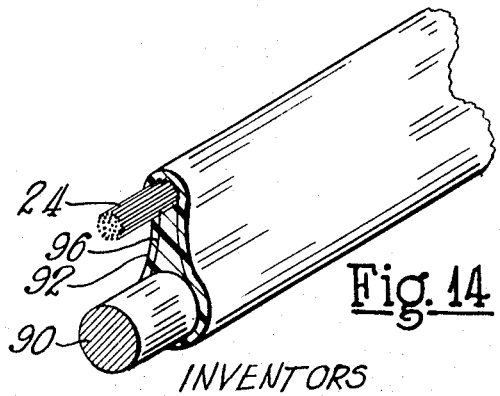

TENSILE MEMBERS, APPARATUS AND PROCESS

This invention relates to composite tensile members, apparatus and process for production.

More particularly, this invention relates to composite tensile members made up of a plurality of specifically oriented line-type tensile elements embedded in an encapsulating matrix.

Still further, this invention relates to glass-resin composite tensile members comprising continuous glass fibers carefully oriented in side-by-side relationship so that all are substantially equally load bearing, and wherein the tensile member has an improved circular sectional configuration. The invention further relates to apparatus and process for producing the composite tensile members wherein a molten bath is used as the direct heat-transfer and pressurizing medium.

The prior practice of fabricating composite tensile member of axially oriented continuous glass fibers and a bonding resin matrix has included the use of a spirally overwrapped strand to preserve the cross-sectional configuration of the structure. The overwrap has not been found to play any part in the tensile properties of the tension members. Actually, the overwrap increases the weight per yard and, therefore, decreases the effective glass breaking stress if the stress is calculated on the total glass content. Thus, the same breaking load is provided as if the overwrap were not there.

An advance to the art would, therefore, be provided by a composite line-type tensile member of uniform cross-sectional configuration but without the spiral overwrap, thereby providing more efficient glass loading.

THE CHARACTERISTICS OF GLASS

Glass fibers are characterized by an extremely high modulus, but do not have a yield point, as distinguished from steel. Thus, in order for glass fibers to be used to the highest degree of efficiency, they must be oriented in a static condition of a composite tensile member, so that they will be equally load bearing when the member is placed under load.

As distinguished from the relatively small use of glass fibers in tensile members by the prior art, steel has enjoyed a great use in cables and the like, with a high degree of success, even though it has substantially lower tensile strength than does glass in fiber form. This is due to the fact that steel has a substantial elongation after yield and thus, as the steel cable stretches, all of the line-type elements making up the cable assume the total load, even though such elements initially be of slightly differing lengths so that the shorter ones take up the load first. Those steel elements that reach the yield point first, continue to remain load-bearing by elongation as the other longer ones take up their portion of the load.

By comparison, glass has no yield point. Thus, in a composite tensile member comprised of glass fibers of differing lengths, the shorter fibers pick up the load first and break when the limit is reached. The longer fibers, therefore, are useless.

It will, accordingly, be understood that in the case of glass fiber tensile members, only a portion of the fibers have heretofore been utilized. In accordance with prior practice, glass fiber containing tensile members have been made substantially oversize in order to provide assurance that enough fibers of the same length are present to support the designed load. This means that a substantial number of longer, nonload-bearing fibers are necessarily present which add to the bulk of the product, but are nonfunctional.

From the foregoing, it will be evident that a substantial contribution will be provided to the art by line-type tensile members, particularly when comprised of high modulus line-type tensile elements having no yield, but wherein all of the elements are rendered substantially equally load bearing.

A further contribution will be provided by apparatus and method for producing such "oriented" tensile members.

It is, therefore, an important object of this invention to provide novel, composite tensile members made up of nonyielding, line-type tensile elements, wherein all of the elements are held together in a hardened matrix in equal load-bearing orientation.

A further object is to provide apparatus for producing the novel composite tensile members.

A further object is to provide a novel process for producing the composite tensile members, utilizing a liquid material as the direct contact heat-transfer agent and as the compression medium to fix an accurate cross-sectional configuration in the completed units.

Other objects of this invention will appear in the following description and appended claims, reference being had to the accompanying drawings forming a part of this specification and wherein like reference characters designate corresponding parts of the several views.

FIG. 3 is an elevational view, partly in section, of a tensile member of the present invention;

FIG. 4 is a sectional view taken along the line 4—4 of FIG. 3;

FIG. 5 is an elevational view, partly in section, of a prior tensile member, analogous to the present invention;

FIG. 6 is a schematic view of a preferred apparatus for manufacturing the novel tensile members of the present invention;

FIG. 7 is an enlarged fragmentary, sectional view of the gathering die 50, employed in FIG. 6;

FIG. 8 is an enlarged, sectional view of the final shaping die and liquid bath hardening arrangement of FIG. 6;

FIG. 9 is an enlarged, fragmentary, sectional view illustrating a variation of the final sizing die that can be used in FIG. 6;

FIG. 10 is an enlarged, fragmentary view, partly in section of a preheater cure arrangement that can be used in FIG. 6;

FIG. 11 is a schematic view of another embodiment of apparatus for practicing the invention with soft matrix materials;

FIG. 12 is a fragmentary view showing how a muffle furnace can be utilized in the apparatus of FIG. 11 for precure;

FIG. 13 shows one practical application of the invention; and

FIG. 14 shows another practical application of the invention.

THE PROBLEM SOLVED BY THE INVENTION

Figure 1:
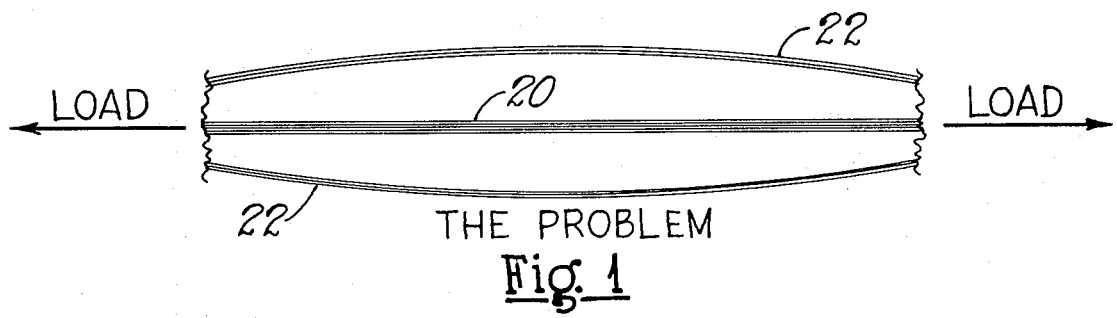
FIG. 1 is a schematic view illustrating the problems solved by the present invention.

This illustrated in FIG. 1 where the central fibers 20 are illustrated as being straight and, of course, thereby become load bearing first when a load is applied to a tensile member having both the shorter fibers 20 and the longer fibers 22 therein. In the case of glass, the shorter fibers 20 assume all of the load and break before the longer fibers 22 assume any load. As discussed above, the absence of yield in glass brings this phenomenon about. Thus, when the shorter fibers 20 break, a cable of this configuration would fail at this moment. It will be understood that the longer fibers 22 are substantially useless and even though they have a high modulus, they are ineffective.

Figure 2:
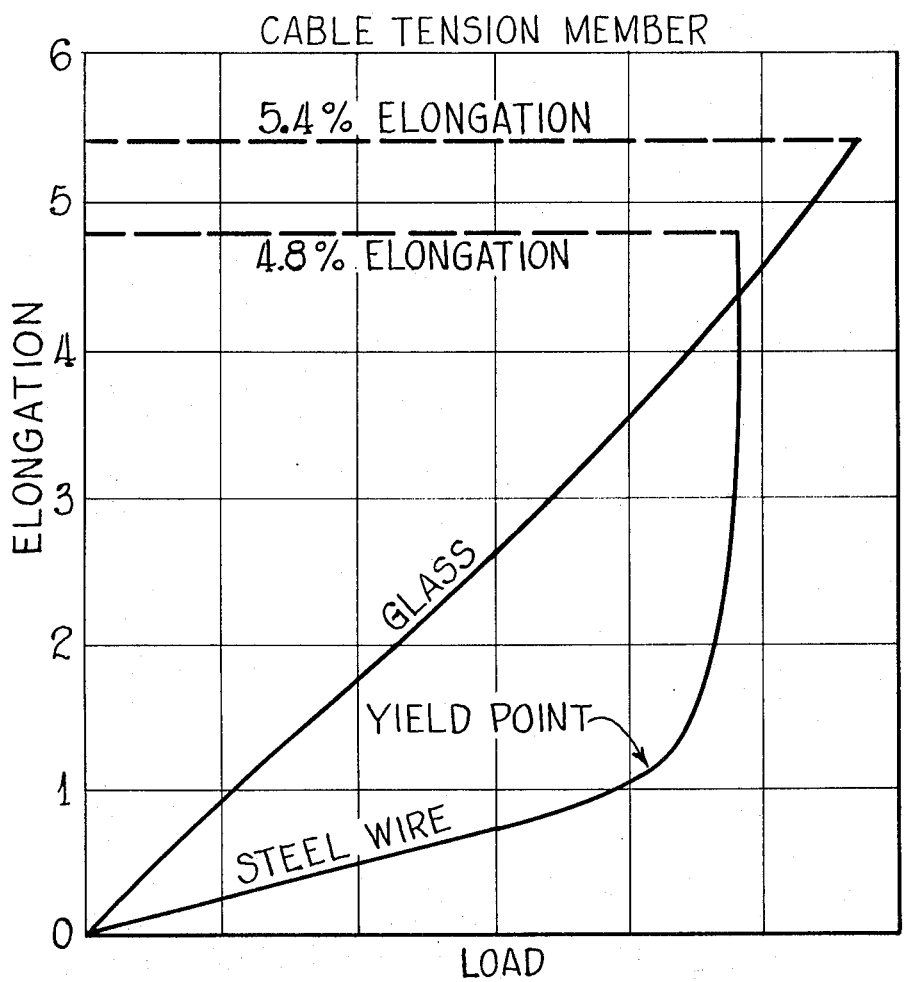
FIG. 2 is a graph which comparatively illustrates the elongation and yield curves of steel and glass, to further highlight the problem solved by the present invention.

FIG. 2 illustrates that, in the case of steel, this condition is prevented by the yield which permits all strands to equalize with one another for load bearing. Once a steel cable has become "conditioned," all fibers making up the cable are load bearing. However, in the case of glass, conditioning is not possible because of the absence of yield. If glass fibers are ever to become conditioned, they must be put into that state when the cable is made.

It will be noted relative to FIG. 2 that steel has a yield point at about 1 percent elongation level. Beyond that, it remains load bearing to the point of break at 4.8 percent elongation. Glass, on the other hand, has no yield, but reaches the break point directly at the maximum elongation of 5.4 percent.

In view of the foregoing, it will be evident in the following description that a substantial advance has been provided by unique tensile member in which a plurality of continuous line-type tensile elements are rendered substantially equally load bearing, and by apparatus and process for molding and compacting the elements together in a bonding matrix in a novel manner.

THE NOVEL TENSILE MEMBERS

These are illustrated in FIGS. 3 and 4. Due to the "orientation" of the individual fibers, this unit will support a designed load without incurring individual fiber breakage. All fibers are positioned in substantially equally fully extended length relationship in the unit, in the unstressed state of the unit, and thereby are equally load bearing.

In a preferred embodiment of the invention, the composite tensile member 24 is made up of a plurality of continuous glass strands 26, each of which comprises a plurality (150 or so) of individual continuous glass fibers 28.

Within the strands 26, there is no particular problem of equal load-bearing orientation because of the manner of manufacture. These strands 26 are formed by pulling a plurality of individual glass fibers from a glass melting bushing which has a corresponding number of feed orifices in the bottom. The molten glass from within the bushing exudes through the orifices, as small streams that are attenuated into the fiber form. By this continuous method of operation, the fibers are drawn out to infinite length and are of such small diameter that they are designated in terms of thousands of yards per pound.

The fibers are drawn out together and converged into a strand and are held in side-by-side relationship by a size material as they are wound onto a package. As the fibers are formed they are placed under the same constant tension. The result is a multifibered strand wherein all fibers are parallel and in adjacent side-by-side relationship. These have no twist.

There is, therefore, no orientation problem relative to the individual fibers within the strands. However, the present invention is concerned with the orientation of the several strands relative to one another in a composite tensile member.

In the usual processing operation to prepare strands for the textile trade, they are subsequently paid off the forming package and provided with twists of one or more turns per inch while they are formed into a serving package. These serving package strands are used in the present invention. However, the broad scope of the invention would include the use of strands taken directly from the forming package and, thus, having zero twist. In an actual embodiment of the invention, strands 26 having one turn per inch were used.

According to an analogous prior process, it has been necessary to place a helically overwrapped strand 30 along the outside of the composite tensile member 32 as shown in FIG. 5. This holds the fibers 28 and the strands 26 in equal length, and thus equally load-bearing orientation and also holds the fibers and strands in compacted relationship to one another. The overwrap 30 is put on after the substantially straight line oriented strands 26 have been impregnated with a matrix resin 34 and shaped carefully to produce a mass of proper cross section, having a controlled content of resin. This is effected by passing the impregnated strands 26 through a circular die, not shown, while the strands are all under carefully controlled tension.

It will be noted that an outer, thin covering 34 of pure resin is provided to protect the surface fibers of the finished tensile member.

By comparison, note the improved tensile element 24 of the present invention as shown in FIGS. 3 and 4. There is no spiral overwrap, yet a preferably circular cross-sectional configuration is inherent in the product. All of the strands 26 are nevertheless perfectly oriented and are held in place by the hardened resin matrix 36.

SPECIFIC EXAMPLE

A tensile member was actually made using 20 strands 26, each comprised of 204 individual fibers of high-strength glass (S-glass) of a fiber diameter measured as 15,000 yards per pound. Each strand 26 contained a resin-compatible binder.

Ciba 6005, epoxy resin, was used as the matrix using boron trifluoride monoethylamine complex as the curing agent. This is a standard Ciba epoxy resin formulation.

The strands were saturated with resin and then gathered and pulled through a sizing die and them immediately into a bath of molten metal which "fixed" the orientation of the strands into the composite tensile member configuration imparted by the die. No helical overwrap was utilized.

The tensile members are so prepared withstood a dead load of 213 pounds at break. This extrapolates to 322,000 pounds per square inch for the composite and 483,000 pounds per square inch for the glass.

The diameter of this unit was 0.029 inch and the ignition loss was 15 percent.

The outstanding tensile values are produced by the equal length of all fibers which causes them to share the load equally. Thus, maximum utility is obtained from all of the glass content.

The density of the tensile members made by the above example is about 1.7. On a strength-to-weight ratio these tensile members are about 5 times as strong as the finest steel piano wire in air. Piano wire has a density of about 8.

By comparison, and due to the lower density and very high tensile strength, a tensile member of the present invention will support itself in air at 120,000 feet on a conservative basis.

In water, the results are even better. Water tends to float the tensile member due to its low density; because of this floatation, the composite tensile member is about 10 times stronger than piano wire on a strength-to-weight ratio. In water the effective density is reduced to about 1.0 whereas the density of piano wire is reduced from about 7.8 in air to about 6.8 in water.

It will be understood that the matrix resin 36, FIGS. 3 and 4, helps the fibers 28 to share the load equally. The matrix 36 tends to distribute the load from one fiber 28 to an adjacent fiber.

In the composite tensile members so made, all strands 26 were of substantially straight line orientation, as in FIGS. 3 and 4. However, the individual strands 26 within the composite tensile member 24 had 1 turn per inch.

Within the scope of the invention substantially any glass and substantially any compatible resin can be used to make the composite tensile members. Also, it may be possible to include other hardenable matrix materials such as low melting alloys, for conductor use.

The broad range of components will fall within the limits of about 90 percent to about 25 percent of glass and from about 10 percent to about 75 percent of weight of resin or matrix material.

Within the scope of the invention, from about 0 to about 10 turns per inch can be utilized in the strands.

THE APPARATUS: EMBODIMENT 1; FIGS. 6 AND 7

In the following description, the points enumerated below will be covered in detail;

1. Orienting a plurality of multifilament strands to approximately equal tension and length, as by a light, nonelongating pulling force;

2. Impregnating the strands with a hardenable matrix material;

3. Gathering the multiple-impregnated strands into adjacent side-by-side relationship while simultaneously removing excess matrix material by means of a first annular gathering die;

4. Substantially simultaneously or in a single step, passing the cablelike gathered member with its wet impregnating matrix material through a very accurate shaping and sizing die to establish substantially final cross section of the tensile member, and subjecting the "shaped" member to a liquid body of direct contact heat-transfer and perfect compression medium. The medium is effective, because of its hydrostatic head, to simultaneously work and wet-out the fibers of the composite member and "fix" the died shape.

These functions are effected by the fact that the medium applies equal radial pressure to all increments of the mass, and by its rapid heat transfer, instantly sets the surface of the hardenable matrix and then quickly sets the remainder of the hardenable matrix throughout the remaining cross section of the mass.

This final setting takes place simultaneously with a gradual but rapid reduction of hydrostatic head as the curing mass moves upwardly through the molten body causing a reduction in the head pressure.

By so operating, a product with a very smooth finish and an improved circular cross-sectional configuration is provided. The illustration of FIG. 4 is reasonably accurate.

As shown in FIG. 6, strands 26 are unwound by being pulled from packages 38 suitable supported in a creel. The package 38 are mounted on axles 40 to which a light braking force is applied so that the light tension force utilized in unwinding the strands is effective to straighten the strands out and align them in substantially equal lengths as they pass through the apparatus. Power driven takeup wheels 76 provide the nonelongating draft force. The strand 26 are passed over a guide lip 42 of a container 44 and into a body of thermosetting resin 46. Within the scope of the invention, the body of resin 46, is to be construed broadly as encompassing a hardenable matrix. The resin may be heated by a hot plate 47. In one typical operating procedure the resin bath was heated at a temperature in the range from about 150°–200° F.

A dip bar 48 is utilized to guide the strands 26 beneath the surface of the liquid resin body 46. The dipped strands then pass through a gathering die 50 which is effective to remove excess resin and to squeeze out air and press the strands 26 together to facilitate resin wet-out. The die 50 also serve to align the multistrands 26 in parallel side-by-side adjacent relationship as shown in FIG. 4. The function of the die 50 is shown in FIG. 7. Die 50 has a tapered hole 51 of specific diameter relative to the number of strands 26. This means that different size dies 50 will be used for different numbers of strands 26.

The gathered strands 26, wetted with resin, emerging from the die 50, resemble a cablelike member 52. This cablelike member 52 is then passed through a final shaping die 54, that is positioned on the bottom wall 56 of a container 58. The container 58 is filled with a hot liquid 60 such as a molten metal alloy. One suitable alloy comprises 50 percent lead and 50 percent tin. Other materials that can be used within the scope of the invention include high melting waxes, hot oils, molten salts or combinations thereof. A molten salt can be floated on a molten metal to prevent oxidation.

Simultaneously with the exit of the cablelike member 52 from the final sizing die 54, it is placed in direct heat-transfer contact with the hot liquid 60. The hot liquid has an appreciable hydrostatic head when it is a metal and the head and head perform two functions;

1. The head functions first to press against the entire peripheral surface of the cablelike member 52 in a uniform radial squeezing action against all increments of the mass. This produces complete wet-out and uniform density throughout the mass and maintains the uniform circular cross section configuration that was established by the final sizing die 54.

2. The direct heat transfer substantially simultaneously flash cures the exterior of the resin mass to a stable condition just beyond the outlet of the die 54. The remaining cure is effected as the cablelike member 52 passes on up through the metal bath 60. As an increment approaches the top of the bath, the hydrostatic head is gradually reduced to zero but the heat input continues so that the resin is cured all the way through the cross section of the member 52. Refer to FIG. 8 relative to this explanation.

It will be understood that a heat source designated schematically as 62 maintains the material 60 at a suitable temperature in order to keep it in liquid condition and at a proper level for appropriate cure of the matrix resin 46 previously placed in the member 52.

The above disclosure has related to the use of contact heat as the sole curing means. Within the scope of the invention, such heat may be used in either a precure or postcure system. For example, impregnated strands containing uncured resin can be partially cured by first passing through a container of heated liquid, and the curing subsequently completed in a convection oven. Also, the opposite procedure might be used. "Oven" as used herein could be a muffle chamber.

As a variation, the final sizing die can be made substantially thicker. This is shown in FIG. 9. By so operating, a heat gradient is produced within the die, from cool at the entrance end, to hot at the exit end. This heat gradient is established by the fact that the exit end of the die is in direct heat-exchange contact with the molten metal 60 and the entrance end is exposed to the atmosphere. If required, it is to be considered within the scope of the invention to cool the entrance end of the die 64 as by a cooling coil 66 as indicated in FIG. 9. The object of the axially thicker die 64 is to partially cure the resin in the die thereby giving enough integrity to the cablelike member 52 so that it will maintain a perfectly established configuration after leaving the die and entering the hot fluid 60.

The foregoing discussion has related to the use of dies producing circular sections. However, within the scope of the invention it is to be understood that other sections such as ovals, multisided structures, etc. can be made in an equally accurate manner.

Further, within the scope of the invention the liquid material 60 can be selected to adhere to the matrix impregnated cablelike member 52. In such a case the liquid will both cure the matrix and coat the member 52 in a single step. In the event that the coating material is an electrically conducting material, the result will be a high tensile strength conductor.

As a modification of the electrical conductor aspect, wire or carbon-containing conductor might be used as a core of the member 52. This could be fed into the center of the unit in the nature of one of the strands 26 as illustrated in FIG. 6. Thus, the conductor would be on the inside instead of the outside as previously discussed, for a high tensile strength, but very compact conductor.

From the molten bath 60 the cablelike member 52 proceeds over a guide wheel 74 to a pair of spaced takeup wheels 76 and thence to a packaging operation as indicated. The takeup wheels are power driven to provide the light tension necessary to pull the strands 26 and the cablelike member 52 through the apparatus.

THE PREHEATER CURE

Within the scope of the invention a preheater 68 can be employed as illustrated in FIG. 10 to initiate the setting of the matrix material prior to entry of the cablelike member 52 into the hot curing liquid 60. For this purpose a muffle-type electrical coil furnace 68 of annular configuration can be employed. A refractory insulating material 70 of annular shape can be suitably retained as an outside wall of the unit and en electrical coil 72 of annular configuration can be positioned on the inside of the refractory material. The temperature of the muffle 68 will be correlated with the lineal feed rate of the cablelike member 52 so that appropriate heat input will be provided for initiating the cure of the resin prior to the time it enters the final shaping die 54.

A SECOND EMBODIMENT OF THE APPARATUS: FIGS. 11 AND 12

This embodiment of the invention may be considered analogous to, but not strictly functionally equivalent to the embodiment of FIGS. 6, 7 and 8. This embodiment utilizes contact heat for the formation of tensile members having a soft bonding matrix such as rubber, vinyls, or materials having generally the same flexibility or elasticity characteristics as rubber.

Strands 26 are taken from rotatable packages 38, mounted on axles 40, which are braked slightly so that the tension applied by the power driven takeup wheels 76 orients the strands to equal length configuration for equal load-bearing functionality.

The strands 26 pass through a body of soft matrix material 78 and thence through the gathering die 50 to form a wet cablelike member 52 which is substantially void free by the fact that the die 50 presses the strands together in adjacent side-by-side relationship. The material 78 may be heated if desired. From the gathering die 50, the cablelike tensile member 52 passes over a guide roll 80 and then downwardly to a large dip wheel 82.

An optional final sizing die 54 can be used as indicated by being suitably supported in space.

The dip wheel 82 is partially immersed in the bath of hot liquid 60 provided in a container 84.

As the cablelike member 52 traverses the dip wheel 82 it is passed down into the hot liquid 60. Heat is applied to the liquid 60 as schematically illustrated at 62 to maintain the liquid at an appropriate temperature for curing the soft matrix material 78.

As the cablelike member 52 traverses the dip wheel 82, the following actions take place:

1. There is an immediate and direct contact exposure to the heat of the liquid 60 which causes the outer surface of the matrix material to shell harden in the nature of a skin and fix the cross section imparted by the final sizing die 54, if such be used;

2. The hydrostatic head of the liquid 60 gradually increases and uniformly presses against the outside surface of the moving mass in a radially inward manner to positively but gradually compact the strands 26 close together in adjacent side-by-side relationship as shown in FIG. 4. The hydrostatic head of the liquid 60 reaches a maximum at the bottom of the dip wheel 82 and then gradually decreases to zero. It will be noted that the pressure decrease is not on a strictly straight line function, but more nearly approaches a logarithmic curve;

3. As each increment of the mass 52 undergoes a gradual decrease in hydrostatic head pressure, the heat input continues so that the soft matrix is cured all the way through the section of the member.

From the molten bath 60, the cured cablelike member 52 proceeds to a guide wheel 74, the over takeup wheels 76 and then to a packaging operation.

IMPORTANT POINT

In the case of rubber bonding materials, passage of the impregnated member 52 through the molten bath 60 at an appropriate depth will produce vulcanization due to the combination of heat and pressure. Also, the wheel 82 flexes the material to facilitate impregnation — in combination with the increasing-decreasing hydrostatic head.

THE MUFFLE PRECURE EMBODIMENT; FIG. 12

Within the scope of the invention, the muffle-type preheater 68 can be employed. The constructional features have been described relative to FIG. 10. The temperature of the muffle 68 is correlated with the lineal feed rate of the member 52 so that appropriate heat input is provided.

In FIG. 12, in one aspect, the muffle 68 is shown suspended in space beneath the final sizing die 54 by means of a suitable bracket member 86. A bracket member 88 is used to support the final sizing die 54.

By this arrangement, the shape imparted by the die 54 will tend to be fixed by the heat of the muffle 68 prior to passage upon and around the dip wheel 82.

Also, as shown in FIG. 12, the muffle 82 can be optionally positioned above the final sizing die 54; or two muffles can be utilized.

The temperature of these two devices or the optional single arrangement can be adjusted to initiate the shaping of the matrix material prior to entry into the final shaping die 54, or will facilitate fixing the shape imparted by the die, after it emerges therefrom and prior to its passage upon the dip wheel 82.

The versatility of this aspect of the invention will be apparent to one skilled in the art and the foregoing description is not meant to be construed as limiting.

EXTENDED SCOPE OF THE INVENTION AND GENERAL COMMENTS

It is to be understood that when a heat-softenable matrix material is employed, the muffles 68, indicated in FIGS. 10 and 12, will be present in the form of heaters and/or coolers as necessary to facilitate wet out and preset of the matrix.

The foregoing description has dealt particularly with glass fibers and an epoxy resin. The invention is believed to have broader scope, however, and thus the principles of orientation, quick curing to "fix" the structure, and other features, should be applicable to a broad range of fibers including those made of metals, resins and others. It, of course, will be evident that the invention is more particularly applicable to line-type tensile fibers having no yield point, typified by glass. The broad range of matrix materials would include, in addition to resins, elastomers such as rubbers, metal and others. The term matrix is to be construed as encompassing both heat-hardenable and heat-softenable materials, with appropriate heat exchange being provided.

In actual practice, the final sizing die 54 is maintained about 0.002 to about 0.005 inch diameter larger than the first die 50. The second die finalizes the cross section and "fixes" the variable factors going into the member 52. These include the compactness of the strands 26 relative to one another and the equal length orientation of all strands.

THE METHOD

In view of the foregoing description, the following method steps are highlighted as being inherent in the present invention;

1. A plurality of multifibered strands are pulled together after being separately impregnated in a hardenable matrix, in a manner to be of substantially equal length. Approximately equal load-bearing configuration is thereby provided which is particularly important for line-type tensile elements having no yield prior to break. The pulling together is effective to simultaneously work the mass for fiber wet-out. The matrix helps hold the fiber orientation so that the fibers assume load at approximately the same time.

2. The gathered mass, in the nature of a cablelike tension member, is then given a final shape, and in a single step with the final shaping, is subjected to a direct contact liquid that is effective to fix the final shape and apply either maximum to zero compression pressure by means of hydrostatic head or zero to maximum back to zero compression pressure by means of a hydrostatic head.

Within the scope of the invention the word "fix" means to solidify or stabilize the shape and variable factors of the composite. Thus, "fix" can be construed as encompassing the setting of a thermosetting resin; thus, hardening a heat-hardenable matrix material. In this aspect, the heat-exchange liquid for fixation, such as the molten bath of FIG. 6, will be a relatively hot liquid.

Also, the word can be construed as solidifying a heat-softenable matrix material. This would imply that the matrix material 46 in the container 44 of FIGS. 6 and 11 could be a hot molten material, such as a metal, compatible, of course, with the strands 26, a high melting wax, a heat-softenable resin such as polystyrene or the like. In this aspect, the heat-exchange liquid for fixation of the matrix material will be a relatively cool liquid.

In this step, the ratio of line-type tensile element to matrix is established and thus physical constitution of the member 52 is established.

Within the scope of the invention, the final shaping can be accomplished by a simultaneous prefixation, either by heating, as shown in FIGS. 9 and 10 and in the dotted outline of FIG. 12; or by a postfixation as shown in the solid outline by the muffle 68 in FIG. 12.

In the foregoing discussion, it is taken for granted that some of the matrix material covers the surface as in FIG. 4 to function as a protective outer shield.

STEP 3—WINDING

The final step of the process includes the winding of the finished product onto a reel or otherwise packaging the product.

TYPICAL PRODUCT APPLICATIONS

Usually a good electrical conductor, such as copper or aluminum, has very low tensile strength. Lead sheathed, insulated copper conductors such as telephone cables are so heavy that a steel support cable is necessary, with the conductor being harnessed beneath the cable. Steel, of course, is very heavy.

In accordance with this invention, a reinforced unit can be made which is lighter in weight by a 4 to 1 ratio than a steel reinforced cable, because that is the strength ratio while the tensile members of the present invention have over steel on an equivalent weight basis.

In FIG. 13, a conductor 90, such as copper or aluminum, is used as the core. Around the conductor 90 is an insulating covering material 92 of rubber, resin or the like. Embedded in the insulating covering 92 are one or more tensile members 24 of the invention. These are light in weight and have very high tensile strength, and are thus capable of supporting a very long length of conductor 90 of substantial weight. An outer wrap can be used to bind the units together as an auxiliary medium to the insulating covering 92 as shown in FIG. 14 at 96, if desired.

This application is particularly good for supporting a long length of conductor in a vertical direction, as beneath the surface of the ocean. The lightweight of the tensile members helps buoy up the composite unit.

In FIG. 14, another form of reinforced conductor is shown with the conductor 90 being embedded in a protective coating material 92, along with a tensile member 24. A support harness member can be employed as at 96, if desired, to cradle the conductor 90.

The foregoing are but some of the uses within the scope of the present invention. Other uses include movable reinforcing members in control cables, tethering cables for balloons, marine and aircraft tow cables, aircraft fending lines, underwater securing cables, and so forth.

Relative to FIGS. 13, 14, 3 and 4 there may be instances where it is desirable to have the tensile members themselves conduct electric current. This can be effected by using a conductive matrix material for the normally nonconductive glass elements.

THE DUAL BREAK EMBODIMENT

Within the scope of the invention, two sets of load-supporting strands can be utilized in a single composite tensile member so that one will reach the break point first and provide a sharp break signal.

One arrangement to produce this effect is to provide one set of fibers in the composite tensile member that has a lower elongation than the other set.

Also, different lengths can produce the effect. As an example, 150 strands 26 of continuous glass fibers can be processed as set out above and the matrix either partially or fully cured. This can produce a core.

The core is then reprocessed by adding an additional exemplary 130 strands into the composite with additional matrix material. As the process is repeated, different lengths are imparted to the two sets of strands so that under increasing load conditions, one will break first to give the signal.

During the final pass of the composite, the matrix if fully cured.

The break signal is adjusted to a threshold level where the cable remains load bearing after the signal is reached. The signal indicates, however, that further loading should be discontinued.

The break signal can be achieved in various other ways as by using different matrix materials in the two passes, and/or different glasses in the two sets of strands. Also, variations in curing the first and final configurations can be employed. A spring-steel wire with very little elongation and practically zero yield might also be used to produce the break signal.

In a further embodiment, the dual break can be achieved by making the first tensile element as described above, with the exception that the resin is not fully cured. Then this composite member is fed back through the system as a core with other raw strands around the outside as an annular sheath wherein all of the raw strands are in parallel, side-by-side relationship. The raw strands are impregnated with matrix material and the excess is removed by means of a die. Then this mass is fully cured.

The reason why a dual break is provided is not fully understood. However, it is believed that the two passes through the system and/or the manner in which the resin is cured are effective to cause the strands of the first formed core to be extended more nearly to their maximum oriented length (without actually being under tension) than are the sheath strands.

FILAMENT WINDING ASPECTS

Due to the small diameter, high strength and flexibility of tensile members of the invention, they will find wide applications in filament winding procedures.

As a general rule, based on experience to date in working with this invention, it has been found that the smaller the diameter of the tensile members per given number of strands used in it, the greater is the tensile strength. Since the small diameter units of the invention exceed the tensile strength of the highest grades of steel and are flexible, they are ideal filament winding materials. Further, they pack closely in a wound skin and are wetted out readily by a bonding matrix and are thus strongly bonded to one another by a relatively small quantity of matrix material. The cured condition of the resin and the tensile members themselves should yield a type of prestressed structure which is resistant to compression and possesses a very high modulus.

It is also possible to filament wind larger diameter, relatively stiff composite members of the invention, to produce unexpected results. Due to the stiffness, winding places the outer fibers in tension and the inner fibers in compression. Such structures withstand external pressures very well since the outer fibers will sustain loading to the point of fiber relaxation before the structure will buckle inwardly. Also, the inner resin is in compression to resist external loading.

Winding by a weaving lay, will produce balanced forces. Thus, fibers on the outside humps will be under tension, as are the fibers on the inside humps. Thus, internal and external pressures will be instantly assumed without the fibers having to be first put under tension by being brought from a static condition.

Submarine hulls and rocket casings are typical applications for filament winding using heavier rodlike members of the invention.

THE CABLE ASPECT

Also, cables can be made by cabling the members. As an example, a core is prepared but only partially cured. Fully cured members of the invention are then wound around the core to form a cable. Final cure bonds the unit into a coherent mass. If desired, both the core and the tensile members can be prepared in partially cured conditions, and a final cure made in cable form.

Optionally, the core can be made of a low tensile material, such as a resin, so that it functions only as a form for the outer sheath.

Other uses for the composite tensile members in their various forms will include reinforcements for prestressed concrete, reinforcements for structural panels, guy wire components, particularly for antenna masts for submarines and the like where sea water corrosion is a factor, jointed or extensible telephone poles, cable armor and the like.

VARYING DIAMETER STRANDS OF DIFFERENT MATERIALS

Within the scope of the invention, tensile members can be made using different diameter strands. Thus, larger diameter strands can be used in one portion and relatively smaller diameter strands and fibers in the other portion of a composite member. In a further modification, strands of one diameter can be used as a core and of a different diameter on the outside shell, or vice versa. In this aspect, the fibers of the strands can be of the same or different diameters.

Also, different types of glass (or equivalent material) can be used. Thus, E-glass strands can be used for one portion of the unit and S-glass for the other portion. These also can be of the same or different diameters.

Further, one type of glass can be used as a core and another type of glass on the outside, also of the same or different diameters.

Constructions of this type lead to the production of laminated structural materials. Thus, coil and leaf springs can be made utilizing the composite members as components. An experimental spring made using these techniques acts much like a shock absorber.

FURTHER COMMENTS ABOUT THE CURING DIE OF FIG. 9

The prior description has indicated that in accordance with FIG. 9 the final sizing die can be substantially thicker to produce a heat gradient within the die for partially curing the resin while still in the die. As an extension of this aspect of the invention, the die 64 of FIG. 9 can be substantially elongated and have a very precise bore. To provide operability with epoxy-impregnated glass fibers, the die should be made from Teflon (trademark) with a hole the size of the finished cablelike member 52.

If the curing distance (which may be several feet) is too long to obtain a continuous hole, the die can be made in short segments or cut longitudinally. It is expected that core temperatures of 400° F. can be obtained with a Teflon (trademark) die and the epoxy resin should not stick to this material due to its inherent lubricating properties.

This system may have an added advantage of producing a finished tensile member with the resin under some degree of compression due to the tensile drag on the composite member while it is being pulled through and cured within an elongated die.

We claim:

1. In a process of producing composite tensile members, the steps of,
   orienting a plurality of line-type tensile elements and making them of equal lengths to render them equally load bearing,
   providing a bath of liquid, thermosetting resin,
   impregnating the plural line-type tensile elements with the liquid, thermosetting resin,
   gathering the plural impregnated elements into a composite member wherein the elements are aligned into adjacent side-by-side coated relationship while simultaneously removing any excess liquid resin,
   providing a shaping means and direct contact, molten metal heat-exchange and compression bath as a single unit,
   and, in a single step, shaping the composite member with the shaping means to a desired final cross section and, simultaneously upon completion of the shaping, subjecting the shaped member to the direct contact, molten metal heat-exchange and compression bath to at least partially fix the shape of the resin coated composite.

2. The process of claim 1 including the step of initially exposing the composite member to a hydrostatic head in the molten metal bath and gradually decreasing the hydrostatic head of said bath to zero.

3. The invention of claim 2 wherein the matrix is heat-hardenable, and including the step of applying heat to said composite member prior to shaping and subjecting it to the molten metal heat exchange bath.

4. The process of claim 1 including passing each increment of the composite member through a heat gradient simultaneously with the shaping of the composite member to final cross section.

5. The process of claim 2 including passing each increment of the composite member through a heat gradient simultaneously with the shaping of the composite member to final cross section.

6. The process of claim 1 including exposing the composite member to zero to maximum to zero hydrostatic head in the molten metal bath.

7. The process of claim 6 including heat-exchanging the composite member prior to subjecting to the molten metal bath.

8. The process of claim 1 including the step of shaping the composite member prior to subjecting the member to the molten metal bath.

9. In a process of producing composite tensile members, the steps of,
   orienting a first set of line-type tensile elements and making them of equal lengths to render them equally load bearing,
   orienting a second set of line-type tensile elements and making them of equal lengths to render them equally load bearing,
   providing a bath of liquid, thermosetting resin,
   impregnating the sets with the liquid, thermosetting resin,
   gathering the impregnated sets into a composite member wherein the elements are aligned into adjacent side-by-side coated relationship while removing excess liquid resin,
   providing a shaping means an a direct contact, molten metal heat-exchange and compression bath as a single unit,
   and, in a single step, shaping the composite member with the shaping means to a desired final cross section and, simultaneously upon completion of the shaping, subjecting the shaped member to the direct contact, molten metal heat-exchange and compression bath to at least partially fix the shape of the resin coated composite member.

10. The invention of claim 9 including the step of orienting the sets to provide different break points in the sets of the composite tensile members.

11. The invention of claim 10 including orienting the sets to different lengths to provide different break points in the sets of the composite tensile member.